Oct. 22, 1968 W. LUDWIG 3,406,492
METHODS USING ONE EQUIPMENT FOR BUBBLE-PACKAGING
DIFFERENTLY-SIZED ARTICLES
Filed March 1, 1966
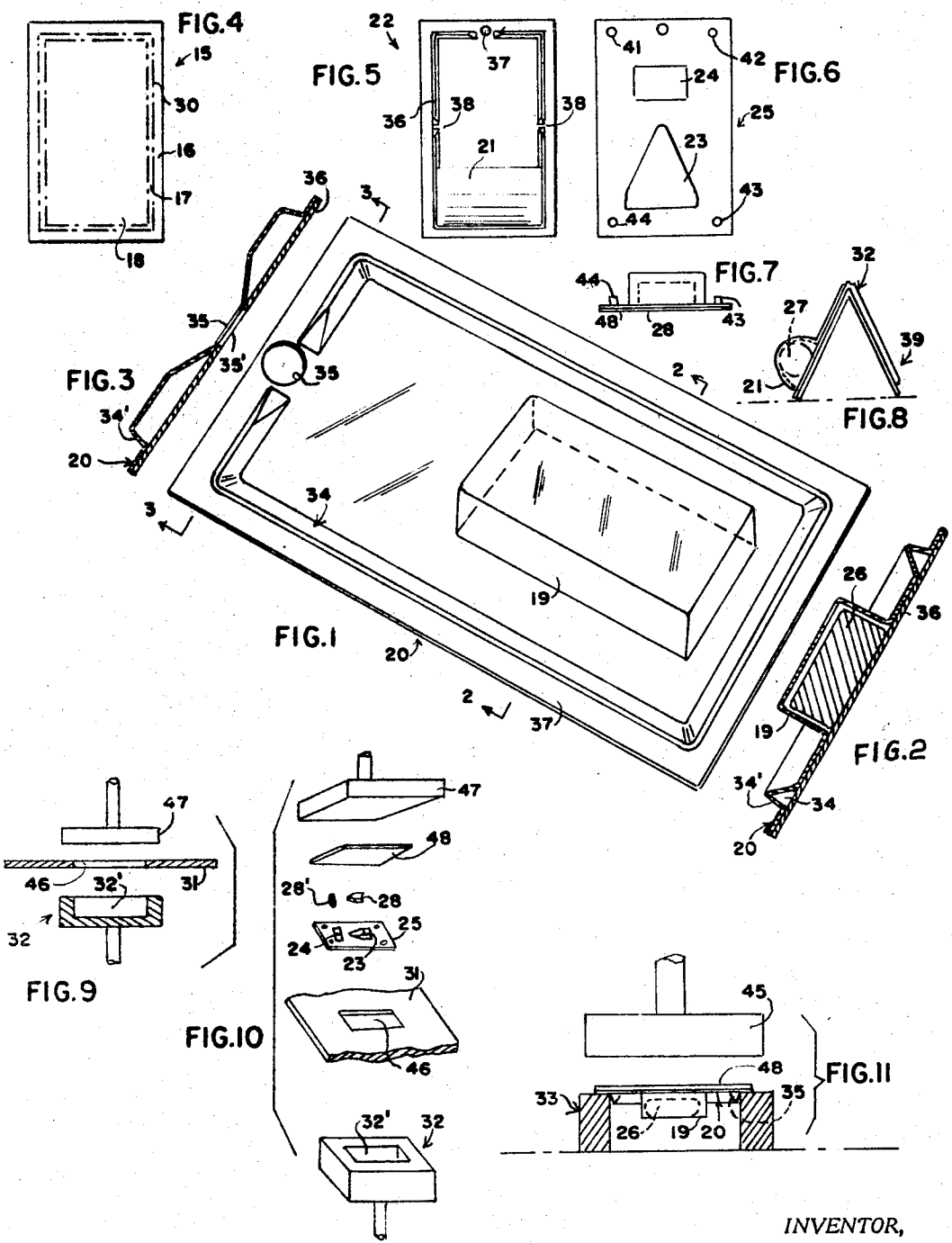
INVENTOR,
Walter Ludwig,
BY
ATTORNEY.

United States Patent Office 3,406,492
Patented Oct. 22, 1968

3,406,492
METHODS USING ONE EQUIPMENT FOR BUBBLE-PACKAGING DIFFERENTLY-SIZED ARTICLES
Walter Ludwig, East Orange, N.J., assignor to Pentapco, Inc., Elizabeth, N.J., a corporation of New Jersey
Filed Mar. 1, 1966, Ser. No. 530,837
2 Claims. (Cl. 53—30)

ABSTRACT OF THE DISCLOSURE

Method for bubble-packaging articles of different sizes, by use without change therein, of a single heat-sealing equipment. The bubbles for a plurality of different items are of identical size and shape, though their wells are formed of different sizes. Each bubble is formed with a flat, narrow perimetrical zone which is to be heat sealed onto a card of bubble area, after the wells are laden. The inward boundary of said marginal zone is the same on all bubbles, and each bubble is formed with locating structure which starts at said inward boundary and away from said zone; such structure being a channel whose depth is in the same direction as the depth of the wells. The said channel is formed with straight aligned interruptions in opposite portions thereof to define a line whereby the package can be folded.

---

The present invention relates to bubble packaging.

A package of this class consists, for instance, of a spool of thread or other small article laid entirely within a prepared depression or well formed in a small transparent thermoplastic sheet, inwardly of the sheet's perimeter; the flat perimetrical lane of which sheet, is heat-sealed onto the surface of a card. In industry, such pre-formed plastic element is called a bubble, or blister, which for the spool, heretofore consisted of a receptacle having a narrow flange around its mouth rim.

Although a manufacturer of a line of items, as notions for example, may have used cards all of one size, the bubbles were of different sizes to suit the various items respectively. Articles in identical bubbles were put through in one run through the heat sealing apparatus, but when the goods needed a different sized bubble, the heat sealing dies and the trays to present the laden bubbles between the dies, had to be changed. Since there were many different sized bubbles, there had to be many different sized heat sealing dies and work-carrying trays. Not only was much capital tied up in such equipment, but there was a loss of time while there was a change being made, and the cost of labor to make such changes, added considerable to manufacturing expense.

It is therefore the principal object of this invention to provide a novel and improved method for bubble packaging articles of different sizes, by use, without change, of a single heat sealing equipment, thus avoiding the aforementioned large capital investment, time loss and added labor cost.

For one practice of this invention, the bubbles for a plurality or multiplicity of different items of merchandise, are of identical perimetrical shape and size, though their wells are different from each other, as is necessary to suit the various items respectively. Each bubble has a relatively narrow, flat perimetrical zone all around it, which is to be heat sealed onto a card, after the wells are laden. The inward boundary of said marginal zone, is of one size on all the bubbles. Each bubble is formed with locating structure which starts at said inward boundary, is away from said zone, and extends in the same direction as the main well or wells which are for housing the merchandise. The heat sealing equipment for use with each and every one of these bubbles, regardless of the nature of its locating structure and the merchandise-receiving wells, comprises essentially a frame, a frame rest and a platen. The frame is to hold a bubble so its locating structure and merchandise receiving wells extend downwardly within the frame's opening, while said marginal zone, commonly called the "flange," rests on top of the frame body. The platen and frame rest, which constitute the sealing and pressure members of the heat sealing apparatus, are relatively movable towards and away from each other, and one of them is heated. The inner perimeter of the frame, and that of an opening in the frame rest, are identical with said inward boundary of the marginal zone of the bubbles. The opening in the frame rest shall be of sufficient depth to receive the deepest of the wells formed in the bubbles. The locating structure on each of the bubbles shall hold them against movement within the frame. All the cards are of bubble size. Though the equipment described is for working on one package at a time, it may be designed for plural production.

In the accompanying drawing forming part of this specification, similar characters of reference indicate corresponding parts in all the views.

FIG. 1 is a perspective view of a bubble embodying construction produced by steps taught herein for practicing my bubble-packaging method for articles of different size, by use without change therein, of a single heat sealing equipment.

FIG. 2 is a section taken at line 2—2 in FIG. 1, of a completed package.

FIG. 3 is a section taken at lines 3—3 in FIG. 1, of a completed package.

FIG. 4 shows a flat sheet of transparent thermoplastic material to be formed into a bubble, showing various zones thereon whose boundaries are indicated by dash-dot lines. Material of a relatively large inner zone is to be formed with wells to receive merchandise to be packaged. The material of the perimetrical zone is to be fused to a covering card. Material of the intermediate zone is to be formed with locating formation.

FIGS. 5 and 6 are top plan views of different bubbles.

FIG. 7 is an elevational view of a package made with a bubble shown in FIG. 6.

FIG. 8 is an end view of a package made with the bubble shown in FIG. 5.

FIG. 9 is an exploded fragmentary diagrammatic view showing the general scheme of a heat sealing equipment for the practice of this invention.

FIG. 10 shows FIG. 9 in perspective and includes the parts to be formed into a package therewith.

FIG. 11 is an exploded fragmentary diagrammatic view of another form of equipment, shown loaded with parts to be made into a package.

Other objects and advantages will become apparent as this disclosure proceeds.

To explain the preferred manner of practice of this invention which as mentioned, affords bubble-packaging many different items of merchandise with heat sealing equipment requiring no change therein regardless of the size and shape of the merchandise-receiving wells in the bubbles, reference is first had to FIG. 4 of the drawing, to show the general scheme of bubble structure. The flat bubble blank of transparent thermoplastic sheet material, indicated generally by the numeral 15, is to be left flat in a relatively narrow perimetrical zone 16, all around it. In the inward zone 17, which abuts the zone 16, the material of the blank is to be formed with suitable formation for locating the bubble in the heat sealing equipment, two forms of which apparatus are shown in the FIGS. 9 and 11 respectively. The remaining large inner zone 18 of the blank 15, is to be formed with depressions, which will be referred to as wells, like shown at 19 in the bubble 20, or at 21 in the bubble 22, or at 23 and 24 in the bubble 25; all of said bubbles being of one size, but their well structures are different in order to suit different articles of merchandise, as 26, 27 and 28, and their locating formations may also be different, as will be explained. However, it is required that all locating formations shall start at the inner boundary line 30 of the perimetrical zone 16, and be away from said outer zone 16, and further, they shall be so constructed that when the bubble is set in the work-receiving frame 31, or within the parts denoted by the numerals 32 and 33 of the respective heat sealing equipments here shown, the bubble will not move in its own general plane, which for all practical purposes, is horizontal.

The locating formation may be a channel 34, formed of the material of the zone 17, as a well whose depth is in the same direction as the merchandise-receiving well 19; said channel occupying all of said zone, except for that part of the bubble 20, which has a hang-up hole 35. The card 36, onto which the perimetrical flange 37 is adhered by heat-sealing, is also provided with a hole 35' which is in registry with the bubble's hole 35. The wall 34' of said channel starting at the line 30, slants very slightly towards the well 19. The cross section of said channel 34, is preferably V-shaped. Such structure is shown in FIGS. 1–3.

In FIG. 5, the locating formation on the bubble 22, is offered in part by the end walls of the well 21, which end walls start at the line 30 in FIG. 4. The rest of the locating formation comprises the channel 36 occupying the rest of the zone 17, interrupted however by the hang-up hole 37 which is optional in all embodiments anywhere described herein, and by the undeformed aligned spots 38, which would allow the package 39 made with this bubble 22, to be bent to form an easel as in FIG. 8, for counter display purposes.

In FIG. 6, the locating formation on the bubble 25, is offered by hollow teats 41, 42, 43, 44, which occupy the corners of the zone 17, and are tangent to the line 30. Any one set of these teats on one diagonal line, would be sufficient in this instance, to locate the bubble in the frame 31 in FIG. 10, or in the opening in the member 33 in FIG. 11.

One form of heat sealing apparatus for adhering the flange of a laden bubble onto a card 48, comprises a heated platen 45 which cooperates with a stationary frame 33, in the latter of which the laden bubble is set inverted, so its flange rests atop the frame 33. For the practice of this invention, the opening in said frame would coincide with the inward boundary 30 of such flange so any of the bubbles 20, 22 or 25, would fit therein, since the boundary 30, according to the general plan set forth in FIG. 4, is common to all of the bubbles regardless of their main well formations which hold merchandise. The feeding of the work in this set-up is done by hand, and as is well known in the art, the platen 45, by any suitable means, is reciprocated after the frame is loaded, allowing sufficient time for the seal to be effected, before the platen is raised.

In automatic machinery, sparsely shown in FIG. 9, the laden bubbles travel with a belt 31, for they are set in spaced cut-outs as 46, in said belt which travels between the heated platen 47 and the frame 32. For the practice of this invention, the cut-outs as 46 and the well 32' of the member 32, all have the perimeter which coincides with the said boundary 30. The belt moves intermittently and stops when the opening 46 is directly over the well 32'. Feeding the laden bubbles inverted into the belt openings is done automatically as is well known. Placing a card 48 atop each of the bubbles, is also automatically effected. Bringing the members 47 and 32 together while the belt is stopped, to effect the seal of the perimetrical flange and the card, and then timely separating said members so the belt can advance and bring new work to the sealing station, is also accomplished automatically, as is a common practice. Since this invention is not concerned with most of the heat sealing equipment per se, further illustration is unnecessary, as to machine parts, and so only so much is shown of the equipment, to indicate the particular requirements the practice of this invention demands thereof, and such are, that the bubble locates against movement in its general plane, in a frame as offered by the openings in the components 31, 32, 33 for supporting the outer perimetrical zone 16, and that the heated platen shall press the card against said zone or outer flange, as it is generally referred to, to effect the assembly.

For the preferred practice of this invention, the outer perimeter of each bubble and each card shall be substantially the same, so all packages made have identical perimetrical shape and size. In all instances, the scheme of layout of all the bubbles shall be in accordance with that shown in FIG. 4, and each shall be of the same perimeter and size. It is not mandatory that the cards be of the same size. Of course, in automatic machine packaging, they would be. Although as specifically illustrated herein, the cards and bubbles are rectangular, they may be of other chosen perimetrical contours.

The practice of this invention is capable of many adaptations without departing from the essential features of procedure herein disclosed. It is therefore intended and desired that the embodiments shown herein shall be deemed illustrative and not restrictive and that the patent shall cover all patentable novelty herein set forth; reference being had to the following claims rather than to the specific showing and explanation herein, to indicate the scope of this invention.

I claim:

1. The method of bubble packaging articles of different sizes by use without change therein, of a single heat sealing equipment including a flat support member having an opening of a predetermined perimeter and a platen member, said members being relatively movable towards and away from each other and at least one of them being heated, consisting of forming in one direction in a transparent thermoplastic sheet, spaced from the perimeter of said sheet, at least one article-receiving well of any shape and size as may be required in the particular instant, and also a sheet-positioning formation in a first lane having an outer perimeter which confines said well and coincides with said predetermined perimeter, said formation starting at said outer perimeter of said first lane and being a channel formed with interruptions in opposite portions thereof, defining a straight line to one side of the well whereby the package is foldable along said line; said channel formation being positioned in said lane so that when the sheet is set, with its said formation into said opening, the sheet will be maintained against movement in its general plane, then placing an article to be packaged into said article-receiving well and placing the laden sheet so that its said locating formation is within said opening, then placing a card of greater size than said opening onto the laden plastic sheet to cover said laden well and have said first lane within and spaced from said outer perimeter of said card, and finally moving said members towards each other to press and fuse together a second lane which confines said first lane, of said plastic sheet to the cardboard.

2. The method as defined in claim 1, and then bending the package along said line whereby the laden-well is fully exposed to view.

References Cited

UNITED STATES PATENTS

| 2,811,246 | 10/1957 | Sloane. |
| 3,129,817 | 4/1964 | Rohdin _____ 206—78 |
| 3,298,158 | 1/1967 | Schmidt _____ 53—373 X |
| 3,347,733 | 10/1967 | Elver _____ 53—39 X |

FOREIGN PATENTS

| 1,355,790 | 2/1964 | France. |

TRAVIS S. McGEHEE, *Primary Examiner.*

N. ABRAMS, *Assistant Examiner.*